(12) United States Patent
Leibbrandt et al.

(10) Patent No.: US 8,092,343 B2
(45) Date of Patent: Jan. 10, 2012

(54) METHOD FOR SETTING THE FILLING PRESSURE FOR A CLUTCH

(75) Inventors: Martin Leibbrandt, Bedburg (DE);
Stefan Kirschstein, Odenthal (DE);
Manfred Henning, Meerbusch (DE)

(73) Assignee: Getrag Ford Transmissions GmbH, Cologne (DE)

( * ) Notice: Subject to any disclaimer, the term of this patent is extended or adjusted under 35 U.S.C. 154(b) by 685 days.

(21) Appl. No.: 12/268,900

(22) Filed: Nov. 11, 2008

(65) Prior Publication Data
US 2009/0125201 A1   May 14, 2009

(30) Foreign Application Priority Data
Nov. 14, 2007   (DE) .................. 10 2007 054 726

(51) Int. Cl.
*B60W 10/04*   (2006.01)
*B60W 10/18*   (2006.01)
*G06F 7/00*   (2006.01)
*G06F 17/00*   (2006.01)

(52) U.S. Cl. ............ 477/174; 477/180; 701/67; 701/68; 192/85.63; 192/109 F; 192/48.601

(58) Field of Classification Search .................... 701/67, 701/68; 477/174, 180, 143, 146, 147, 149; 192/85.63, 109 F, 48.601, 82 T, 103 F
See application file for complete search history.

(56) References Cited

FOREIGN PATENT DOCUMENTS
| | | |
|---|---|---|
| DE | 197 39 215 | 3/1998 |
| DE | 198 26 097 | 12/1999 |
| DE | 10 2006 045 573 | 4/2008 |

*Primary Examiner* — Jeffrey Shapiro
(74) *Attorney, Agent, or Firm* — Schlee IP International, P.C.; Alexander R. Schlee

(57) ABSTRACT

A method for determining the filling pressure for a clutch and a hydraulic clutch adapted to conduct said method are suggested where clutch linings are brought into engagement against the force of a clutch release spring by a hydraulic pressure system. The hydraulic pressure is controlled such that an engagement point where the clutch linings abut against each other but without establishing a torque transmitting capacity in the clutch can be reached quickly and precisely. The purpose is to achieve a short gear shifting time, but at the same time avoid impacts due to premature torque transmittal capacity in the clutch during gear shifting. A precision shifting mode or a fast shifting mode can be established, compromising speed and torque transmitting capacity depending on the preferred driving mode.

20 Claims, 4 Drawing Sheets

US 8,092,343 B2

METHOD FOR SETTING THE FILLING PRESSURE FOR A CLUTCH

CROSS REFERENCE TO RELATED APPLICATION

This application claims the priority right from the German patent application DE 102007054726.0 that was filed on Nov. 14, 2007, the content of which is herewith incorporated in its entirety by reference.

BACKGROUND OF THE INVENTION

The invention relates to a method for setting the filling pressure for a clutch comprising clutch linings, a clutch release spring and a hydraulic pressure system for closing the clutch against a force from the clutch release spring, wherein the clutch linings are brought at an engagement point of the clutch into abutment such that a further increase of the pressure in the pressure system would establish a torque transmittal capacity in the clutch.

Typically, the hydraulic pressure system of a clutch cylinder comprises a clutch piston that is connected to an input side and an output side of the clutch in a fixed manner and rotates therewith. At the engagement point of the clutch the force from the clutch cylinder exerted onto the clutch pads is compensated by the force from the clutch release spring so that the clutch linings just abut against each other but without exerting any significant thrust forces against each other.

In the automotive field use of clutches that are automatically controlled by a control device have become more and more common, as for instance clutches in dual clutch transmissions. For this type of actuating a clutch it is important to determine exactly the engagement point for guaranteeing high quality of the clutch operation.

For determining this engagement point starting from the entirely released clutch position, the clutch cylinder needs to be filled with hydraulic fluid. For accomplishing this filling action quickly, the filling pressure can be set to a high value. Such a high filling pressure allows establishing a high volume flow in the pressure system so that the clutch cylinder is filled quickly so that the engagement point, starting from the released clutch, is reached in a short period of time. However, due to the high filling pressure there is a risk that the clutch cylinders and the clutch piston exert a force onto the clutch lining during the filling action that is higher than the counterforce exerted by the clutch release spring, resulting in the clutch already having some torque transmittal capacity. In a motor vehicle where a clutch is filled in that manner, this may result in a noticeable impact that affects the driving comfort.

If in contrast the filling pressure is set to a value that is too low, filling of the clutch cylinder and therefore reaching the engagement point can take so much time that driving comfort is likewise affected when shifting gears in the motor vehicle.

In the DE 10 2006 045 573 published on Apr. 3, 2008 after the priority date of the present application a method for setting a filling pressure for a clutch is described wherein the hydraulic pressure system is subjected to a filling pressure that is significantly higher than the engagement pressure maintaining the hydraulic pressure system of the clutch at the engagement point. The filling by the filling pressure ends when the actual pressure has reached a predetermined turn off pressure. After reaching the turn off pressure and after a damping period a face size K between the actual pressure and the engagement pressure is calculated. Depending on the calculated face size K (negative/positive prefix) the filling pressure is adjusted for the next filling. Several filling actions are repeated until the turn off criterion is reached, for example when the determined face size K falls below a threshold value.

Although according the method described in DE 10 2006 045 573 can generally reach good results, such a method may in the practical application be problematic, in particular when the pressure in the hydraulic pressure system is controlled after reaching the turn off pressure to become the engagement point pressure. Therefore, the face size K does not provide a reliable determination of the filling status of the hydraulic pressure systems.

SUMMARY OF THE INVENTION

It is an object of the invention to provide a method for setting the filling pressure in a clutch and control the pressure in the clutch after the initial filling pressure has been turned off that can also be performed and provides good results even after the initial filling pressure has been turned off.

In the method described in claim 1, in step A the pressure system is pressurized with a filling pressure $p_{Puls}$ that is an estimated value based on a result from a previous determination that has to be verified or improved now. During pressurizing of the pressure system with the filling pressure $p_{Puls}$ the actual pressure $p_{Ist}$ is measured in step B. Pressurizing of the pressure system with the filling pressure $p_{Puls}$ is terminated when the actual pressure $p_{Ist}$ has reached a turn off pressure $p_{End}$ and has therefore reached the end time $t_E$ that can thus be determined (step C). Accordingly, the end time $t_E$ depends from the graph of the actual pressure $p_{Ist}$ over time and the chosen value for the turn off pressure $p_{End}$.

After the actual pressure $p_{Ist}$ has reached the turn off pressure of $p_{End}$, the pressure system is now only subjected to a different target pressure, namely the engagement point pressure $p_{Stroke}$. The engagement point pressure $p_{Stroke}$ is thereby equal to the pressure in the pressure system where the force from the clutch release spring is just compensated when the clutch linings have reached the abutment position. By means of the engagement point pressure $p_{Stroke}$ the engagement point of the clutch can be established (compare step D).

In the step E determination of the maximum value $p_{max}$ for the actual pressure $p_{Ist}$ after the end time $t_E$ follows, wherein the maximum value $p_{max}$ is compared to a maximum admissible pressure $p_{Maxpuls}$.

In the step F determination of the filling pressure $p_{Puls}$ for the next filling follows in that an increment $\Delta p$ or a change value $K_1$ is added to the filling pressure $p_{Puls}$ if the maximum value $p_{max}$ is lower than the maximum admissible pressure $p_{Maxpuls}$. The increment $\Delta p$ or a change value $K_1$ is subtracted from the filling pressure $p_{Puls}$ when the maximum value $p_{max}$ is higher than the maximum admissible pressure $p_{Maxpuls}$.

The maximum admissible pressure $p_{Maxpuls}$ can be set such that when reaching this value the actual pressure $p_{Ist}$ closes the clutch beyond its engagement point and starts establishing a torque transmittal capacity that is, however, too small for creating noticeable impacts during the driving operation. An "optimum" filling pressure is present when the maximum pressure $p_{max}$ is as high as possible but does just not create a noticeable impact. Accordingly, the maximum admissible pressure $p_{Maxpuls}$ is established when the "optimum" filling pressure is exactly matched by the maximum pressure $p_{max}$.

In this connection it has to be noted that a pressure sensor for measuring the actual pressure $p_{Ist}$ is provided between a control valve and the clutch cylinder. In case of higher volume flows in the pressure system when it is subjected to the filling pressure $p_{Puls}$, the actual pressure in the clutch cylinder is lower than the measured actual pressure $p_{Ist}$. Therefore it may occur that during filling the clutch it is not considerably closed beyond its engagement point, even though the maximum value $p_{max}$ for the actual pressure $p_{Ist}$ measured at the pressure sensor is notably higher than the engagement point pressure $p_{Stroke}$.

Preferably, for determining of the maximum pressure $p_{max}$ a time period at least comprising a damping time $t_1$ is provided. During this damping time $t_1$, measured from the end time $t_E$, the actual pressure $p_{Ist}$ is measured continuously and its maximum value is recorded as the maximum pressure $p_{max}$.

For determining a maximum pressure $p_{max}$ it is possible to provide in addition or in the alternative a time period that ends when the actual pressure $p_{Ist}$ is between a bottom threshold value $p_{K1}$ and a top threshold value $p_{K2}$. In this manner, according to a preferred embodiment, the actual pressure $p_{Ist}$ is analyzed for its maximum pressure $p_{max}$ until the damping time $t_1$ has expired and while the actual pressure $p_{Ist}$ is time between the threshold values $p_{K1}$ and $p_{K2}$.

A cycle with the steps A to F can be repeated several times until a termination criterion is fulfilled. Therefore, the method according to the invention can be used as an iterative process for determining the "optimum" filling pressure.

The increment $\Delta p$ is reduced according to a preferred embodiment when in two subsequent cycles the maximum pressure $p_{max}$ is one time higher and one time lower than the maximum admissible pressure $p_{Maxpuls}$. This is an indication that in one of the two cycles the filling pressure $p_{Puls}$ has been chosen as too high and in the other one of the two cycles the filling pressure $p_{Puls}$ has been chosen too low. In other words, the "optimum" filling pressure $p_{Puls}$ is between the filling pressures of the two cycles. By reducing the increment $\Delta p$ it is possible to analyze the range between the two filling pressures of the two cycles in more detail, approaching step-by-step the "optimum" filling pressure. A possible termination criterion can be in that the pressure increment $\Delta p$ decreases below a neglect threshold pressure $\Delta p_{Grenz}$. Another or additional termination criterion can be fulfilled when the difference between the maximum pressure $p_{max}$ and the maximum admissible pressure $p_{Maxpuls}$ has a lower absolute value than a neglect value.

Preferably, the iterative process as described above in its various preferred alternatives is applied when the clutch is operated for the first time. When a filling pressure $p_{Puls}$ is determined that results in a maximum pressure $p_{max}$ in the pressure system that is substantially equal to the maximum admissible pressure $p_{Maxpuls}$, this measured filling pressure is stored and provides the basis for the control of the clutch during operation.

The filling pressure $p_{Puls}$ and/or the turn off pressure $p_{End}$ can depend during the operation of the motor vehicle from the filling method that is chosen depending on the driving conditions as a higher performance driving function. Influencing parameters can for instance be the type of shifting (manually actuated shifting or automatic shifting, shifting towards higher gears or lower gears, thrust or pull shifting), a gas pedal position, a speed, or possibly a measured incline or a speed, when a shifting lever of a motor vehicle is moved.

For example, in case of a fast filling the filling pressure $p_{Puls}$ can be increased by a pressure offset $C_1$ and the turn off pressure $p_{End}$ can be increased by a pressure offset $C_2$. It is also possible that only the filling pressure $p_{Puls}$ can be increased by a pressure offset $C_1$ and only the turn off pressure $p_{End}$ can be increased by a pressure offset $C_2$. In the fast filling mode, it has to be accepted that the filling pressure $p_{Puls}$ may result in a maximum pressure $p_{max}$ due to the pressure offset $C_1$ that is above the maximum admissible pressure $p_{Maxpuls}$. The result is that this filling process closes the clutches beyond the engagement point and therefore establishes a notable torque transmittal capacity, but results in faster shifting in a shorter shifting time.

In case of a precision filling, the filling pressure $p_{Puls}$ can be reduced by a pressure value $C_3$ and/or the turn off pressure $p_{End}$ can be set to the engagement point pressure $p_{Stroke}$. The latter measures can prevent that the actual pressure $p_{Ist}$ swings beyond the engagement point pressure $p_{Stroke}$ or swinging over is limited to the reaction time of the control valve in the pressure system. This allows a smooth shifting without any impacts but results in longer shifting time periods.

The above mentioned filling methods (fast filling, position filling) are deviations from the standard filling method. While the fast filling mode results in shorter filling time by accepting notable impacts and the precision filling mode results in longer filling periods the standard filling method is a medium approach that does neither result in an overfilling, nor in lowfilling.

Since it can be expected that the pressure system changes over the life span of the clutch (friction in the valves or in the clutch, flow changes caused by leakage, changes in the viscosity of the oil) an adaption of the filling pressure $p_{Puls}$ during the operation of the clutch is advantageous. The adaption should preferably be performed in case of the standard filling method, but is not restricted thereto.

For determining the filling pressure $p_{Puls}$ for the next filling in particular during continuous operation of the clutch the change value $K_1$ can be added to the filling pressure $p_{Puls}$ when after the turn off time $p_{End}$ a maximum admissible time $t_{Maxtime}$ is exceeded. Such an exceeding of the maximum admissible time period $t_{Maxtime}$ can for instance occur when the filling pressure $p_{Puls}$ is too low and therefore the actual pressure $p_{Ist}$ after turning off the filling pressure $p_{Puls}$ may fall below the engagement point pressure $p_{Stroke}$ due to the volume flow in the pressure system and may just reach after a certain time period the pressure corridor between the lower and higher threshold values $p_{K1}$ and $p_{K2}$.

According to a preferred embodiment, for determining the turn off pressure $p_{End}$ for the next filling a change value $K_2$ is added to the turn off pressure $p_{End}$ when the change value $K_1$ is added to the filling pressure $p_{Puls}$, and the change value $K_2$ is subtracted from the turn off pressure $p_{End}$ when the change value $K_1$ is subtracted from the filling pressure $p_{Puls}$. If for instance the maximum pressure $p_{max}$ is lower than the maximum admissible pressure $p_{Maxpuls}$ not only the filling pressure $p_{Puls}$ but also the turn off pressure $p_{End}$ is increased. Both measures result in an increase of the maximum pressure $p_{max}$ that equals ideally the maximum admissible pressure $p_{Maxpuls}$ is just that high that no impact can be noticed when filling the clutch.

The filling pressure $p_{Puls}$ can be a function of the rotational speed of a hydraulic pump and/or of the temperature. In the alternative or in addition, the turn off pressure $p_{End}$ can be a function of the filling pressure $p_{Puls}$, the rotational speed of the clutch and/or of the temperature of the clutch.

When pressurizing the pressure system with the filling pressure $p_{Puls}$ it is useful to start from a starting pressure $p_0$ where the clutch is safely released. This means that the starting pressure $p_0$ should be lower than the engagement point pressure $p_{Stroke}$.

The control valve of the pressure system can be controlled electrically. This control valve establishes depending on the electrical control current a particular hydraulic pressure in the pressure system. For enhancing the control quality, the pressure system may comprise a superimposed pressure control correcting an electric control current for the control valve.

During pressurizing the pressure system with the filling pressure $p_{Puls}$ preferably a PD control characteristic (proportional plus derivative control) is established for the superimposed pressure control. According to a preferred embodiment at an end time $t_E$ that is also the point in time when the filling pressure $p_{Puls}$ is reduced to the engagement point pressure $p_{Stroke}$, the superimposed pressure control is turned off until the pressure system has reached its static condition. For example, the superimposed pressure control can then remain turned off until the electrical actual value of the current of a subsidiary current control of the control valve reaches the target value or falls below it or until the actual pressure $p_{Ist}$ has reached the engagement point pressure $p_{Stroke}$ or has fallen below it, depending on what event occurs first. Thereafter, the superimposed pressure control is turned on wherein then preferably a PID control characteristic (proportional plus floating plus derivative control characteristic) is established.

BRIEF DESCRIPTION OF THE DRAWINGS

By referring to the embodiments shown in the drawings the invention is described in more detail in the following. In the drawings show.

DETAILED DESCRIPTION OF THE DRAWINGS

Figure 1:
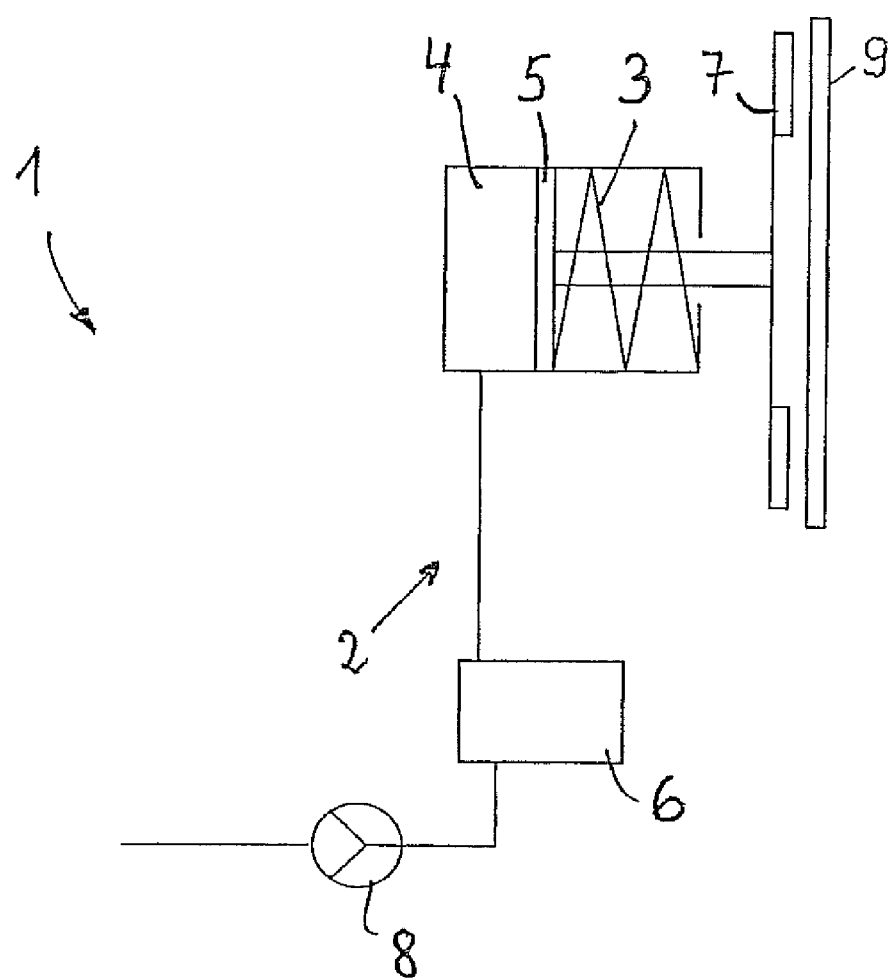
FIG. 1 a schematic illustration of a clutch having a hydraulic pressure system and a clutch release spring.

In a schematic manner, FIG. 1 shows a clutch 1 mounted into a motor vehicle, said clutch comprising a hydraulic pressure system 2 and a clutch release spring 3. The pressure system comprises a pressure cylinder 4 and a clutch piston 5. The pressure of the clutch cylinder 4 or the clutch piston 5 can be controlled by a control valve 6 that is connected at the input side with a pressure source 8.

By means of the pressure system 2 a clutch lining 7 of the clutch 1 can be pressed against a clutch lining 9 of the clutch 1 so that due to frictional forces between the clutch linings 7, 9 the clutch 1 can transmit a torque.

When the clutch piston 5 is not subjected to a hydraulic pressure, the clutch release spring 3 disengages the two clutch linings 7, 9 by forcing these apart so that the clutch 1 is released and no torque can be transmitted. In the clutch cylinder 4 now a pressure can be established bringing the clutch lining 7, 9 into the engagement point but establishing an engagement pressure between the clutch linings 7, 9 that is zero or substantially zero. At this point, the force acting onto the clutch piston 5 due to the pressure in the clutch cylinder equals the force from the compressed clutch release spring 3. A further increase in the pressure in the clutch cylinder 4 results in immediate pressing of the clutch lining 7, 9 against each other, enabling the clutch to transmit torque. The pressure in the clutch cylinder 4 at the point when the force exerted onto the clutch cylinder piston 5 equals the spring force of the compressed clutch release spring 3 when the clutch lining 7, 9 are at the engagement point equals the engagement point pressure $p_{Stroke}$ of the clutch 1 that can be established as the respective target pressure in the pressure system by the control valve.

When the clutch piston 5 is subjected to the engagement point pressure $p_{Stroke}$ the clutch 1 has reached the engagement point at which just no torque is transmitted via the clutch 1. For example, the clutch 1 can be part of a dual clutch transmission comprising two wet clutches and being installed into a motor vehicle. For a quick gear shifting the time period for filling of the clutch 1 or the other clutches of the dual clutch transmission should be as short as possible. Under the filling period, that time period should be understood that it is necessary for bringing the clutch starting from the entirely released position into the engagement point.

For determining a filling pressure $p_{Puls}$ as a target value for the pressure system allowing a short filling time, according to an embodiment of the invention a cycle has to be repeated a number of times. During the cycle the pressure system, starting from a pressure $p_0$, is subjected to a filling pressure $p_{Puls}$. Due to the hydraulic characteristics of the pressure system or the entire clutch the reaction from subjecting to a filling pressure $p_{Puls}$ is an increasing actual pressure $p_{Ist}$ starting from the pressure $p_0$ and resulting from the volume flow in the pressure system that closes the clutch 1 with a certain delay up to reaching the target pressure.

The pressure $p_0$ is below the engagement point pressure $p_{Stroke}$ that is present at the end of the cycle in the pressure system in the clutch 1 at its engagement point. Since the pressure $p_0$ is lower than the pressure $p_{Stroke}$ it is guaranteed that the clutch 1 is open at the beginning of the cycle.

Subjecting the pressure system 2 to the filling pressure $p_{Puls}$ takes as long as the actual pressure $p_{Ist}$ takes to reach the turn off pressure $p_{End}$. The turn off pressure $p_{End}$ also has to be set and is preferably a function of the filling pressure $p_{Puls}$. For example, the turn off pressure $p_{End}$ may have a constant pressure difference compared to the filling pressure $p_{Puls}$, for example of 600 mbar or 800 mbar.

Figure 2:
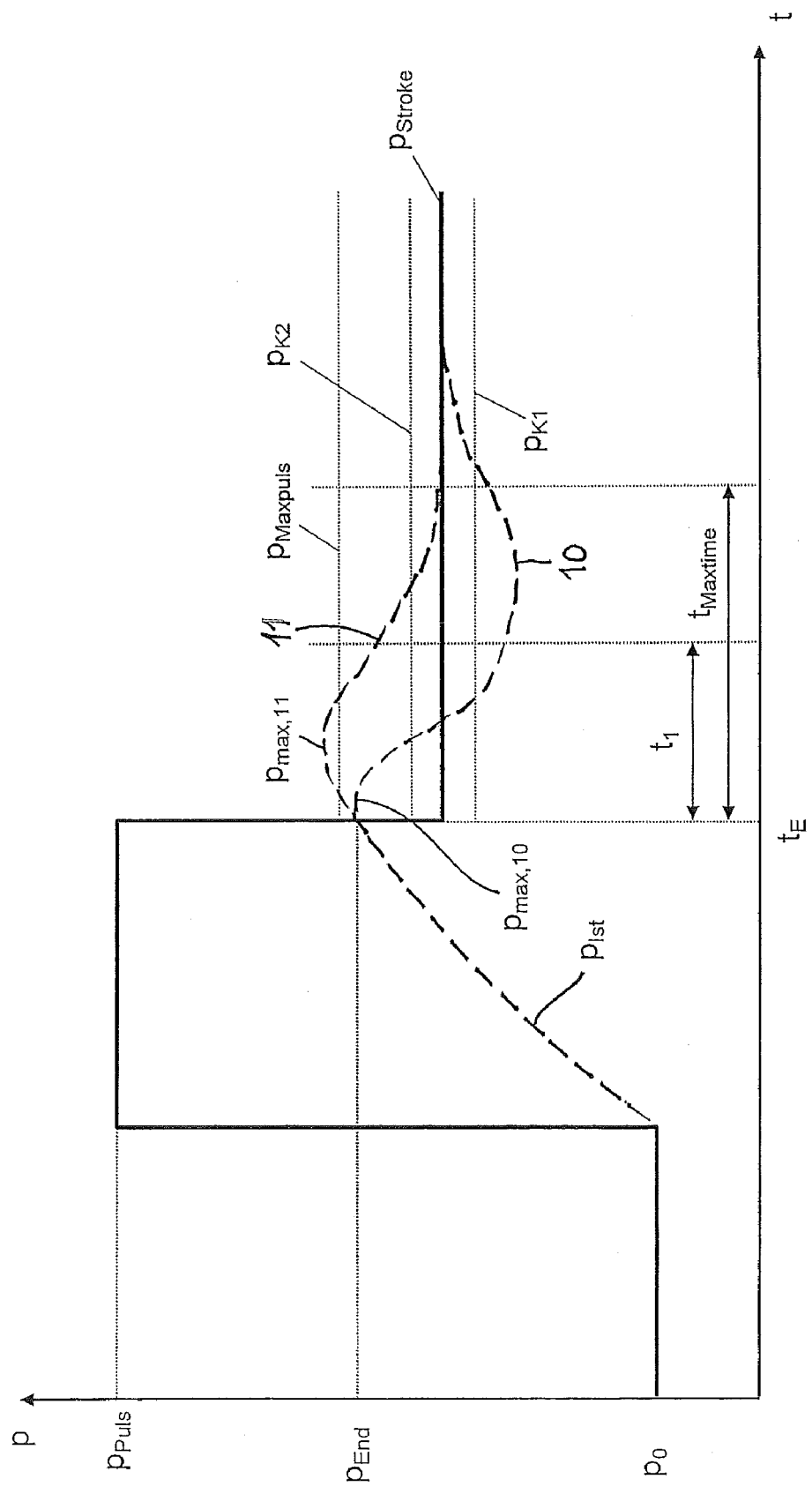
FIG. 2 various pressure graphs illustrating the filling action of the clutch according to an embodiment of the invention.

When the actual pressure $p_{Ist}$ has reached the turn off pressure $p_{End}$ (see end time $t_E$) the pressure system is subjected to the engagement point pressure $p_{Stroke}$ as a target value. After a few milliseconds after reaching the end time $t_E$ a PID control is turned on that is superimposed to the control valve 6 and corrects for enhancing the pressure control quality an electric control current for the control valve. In FIG. 2, after reaching the turn off pressure $p_{End}$, the actual pressure $p_{Ist}$ may comprise two possible graphs 10, 11 that are discussed in the following in more detail.

If, for example, in the cycle the filling pressure $p_{Puls}$ is chosen too low (see graph 10), the actual pressure $p_{Ist}$ reaches the turn off pressure $p_{End}$ before the clutch linings 7, 9 of the clutch 1 reach the engagement point. After reaching the turn off pressure $p_{End}$ while the set engagement point pressure $p_{Stroke}$ is set at this point of the cycle, in the pressure system 2 an actual pressure $p_{Ist}$ is established that should be below the engagement point target pressure $p_{ASoll}$ (see reference numeral 11). The reason for this is a volume flow in the pressure system 2 with respective flow losses that are necessary for moving the clutch piston 5 further until the clutch lining 7, 9 are getting into engagement.

According to the invention, after reaching the end time $t_E$ within a certain time frame for the actual pressure $p_{Ist}$ a maximum pressure $p_{max}$ occurring in this timeframe is determined. For the graphs 10, 11 the respective maximum pressures $p_{max,10}$ and $p_{max,11}$ are depicted in FIG. 2. The time window has the length of the damping time $t_1$. In addition, the time window is kept open until the actual pressure $p_{Ist}$ acts within the pressure corridor defining a lower threshold value $p_{K1}$ and an upper threshold value $p_{K2}$. The pressure corridor can for instance have a width of 100 mbar and can be symmetrical to the engagement point pressure $p_{Stroke}$.

According to the graph 10 a maximum pressure $p_{max,10}$ is lower than a maximum admissible pressure value $p_{Maxpuls}$.

The maximum admissible pressure $p_{Maxpuls}$ is set such that during the filling action this pressure value $p_{Maxpuls}$ allows that the clutch 1 is barely closed beyond the engagement point and establishes a torque transmittal capacity that can be just noticed. It has to be noted that the actual pressure $p_{Ist}$ in the pressure system between the control valve 6 and the clutch cylinder 4 is measured by a pressure sensor that is positioned accordingly. Due to the volume flow during the filling action the pressure sensor measures an actual pressure $p_{Ist}$ that is higher than the pressure acting in the clutch cylinder 4. This explains a particular difference between the maximum admissible pressure $p_{Maxpuls}$ and the engagement point pressure $p_{Stroke}$.

Since the maximum pressure $p_{max,10}$ of the graph 10 is lower than the maximum admissible pressure $p_{Maxpuls}$, now for the next cycle the filling pressure $p_{Puls}$ is increased by a particular increment $\Delta p$. This results in that the clutch 1 can be filled faster and the then established maximum pressure $p_{max}$ is closer to the maximum admissible pressure $p_{Maxpuls}$ if the pressure increment $\Delta p$ is not to high.

If, however, the chosen filling pressure $p_{Puls}$ is too high (see graph 11), the respective maximum pressure $p_{max,11}$ is above the maximum admissible pressure $p_{Maxpuls}$. According to graph 11 the filling has resulted in that the clutch linings 7, 9 are already prior to or at the least at the end time $t_E$ at the engagement point while due to the reaction time and dynamic effects the actual pressure $p_{Ist}$ in the pressure system increases further even though the target pressure has been reduced to the engagement point pressure $p_{Stroke}$. This means that the clutch 1 has been closed beyond its engagement point and starts increasing its torque transmittal capacity. According to the invention, for the next cycle, reduction of the filling pressure by the pressure $\Delta p$ is conducted.

By repeating the cycle as shown in FIG. 2 several times with different filling pressures $p_{Puls}$ and the determination whether the respective maximum pressure $p_{max}$ is below or above the pressure value $p_{Maxpuls}$ in an iterative approximation calculation the "correct" or "optimum" filling target pressure $p_{BSoll}$ is determined. According to the invention, this is achieved when the maximum pressure $p_{max}$ reaches the maximum admissible pressure $p_{Maxpuls}$.

Figure 3:
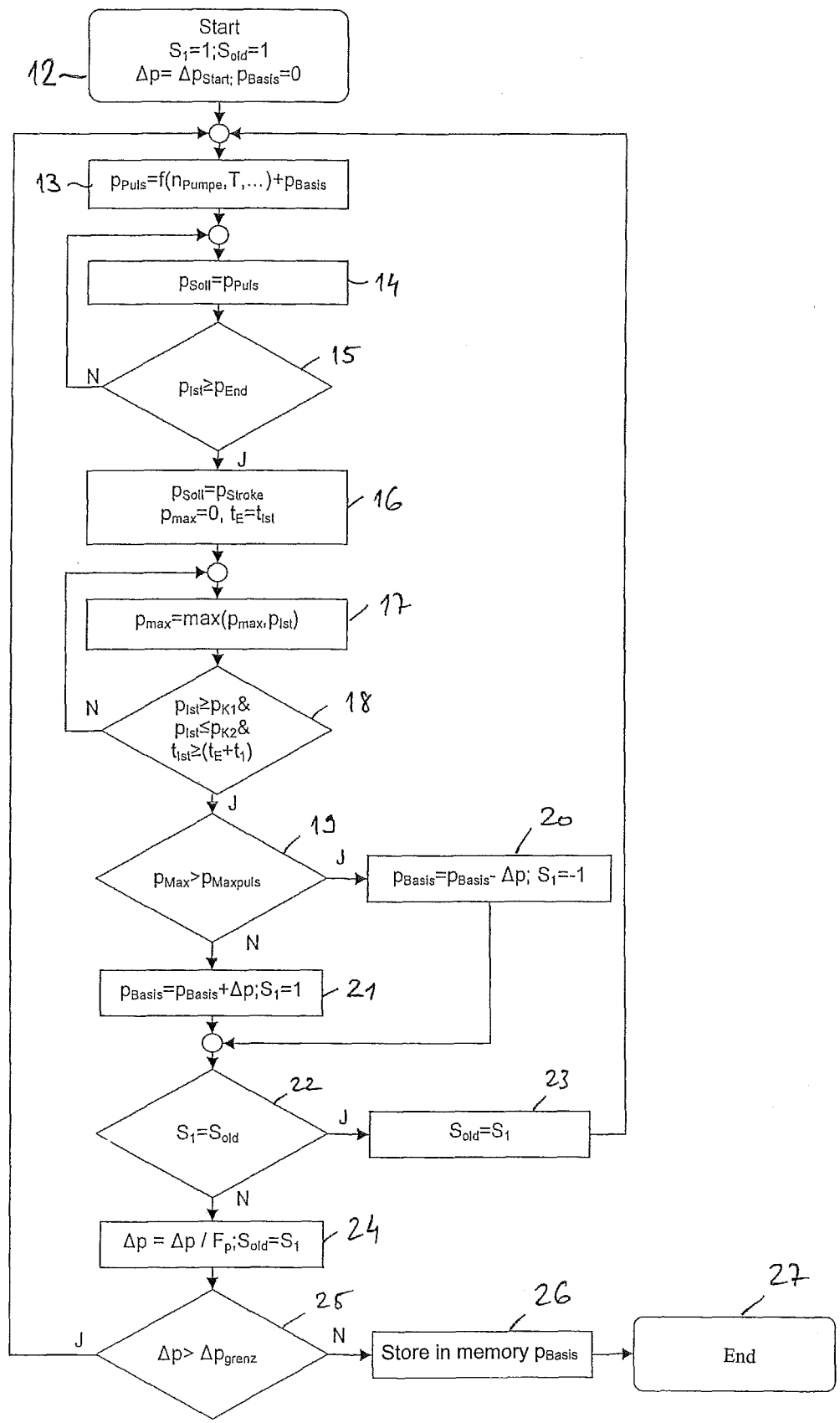
FIG. 3 a flow diagram of a preferred embodiment of the invention.

FIG. 3 shows a flow diagram of the iterative calculation method wherein the cycle described above is repeated several times until a termination criterion is fulfilled and the "correct" filling pressure $p_{Puls}$ has been determined. In a starting block 12 at first the increment $\Delta p$ is set to a starting pressure increment $\Delta p_{Start}$ and the indicators $S_1$ and $S_{old}$ are set to 1, said indicators been used as indicators for the last direction of correction.

Following the starting block 12 is a block 13 where the filling pressure $p_{Puls}$ is the sum of a base pressure $p_{Basis}$ and a function that depends on the rotational speed of the pump of the pressure source 8, the temperature and other parameters. The blocks and determinations denoted 14 to 21 have already been described for the most part above. In addition, as a target value the pressure system is subjected to the filling pressure $p_{Puls}$ (block 14) until the actual pressure $p_{Ist}$ and has reached the end pressure $p_{End}$ (determination 15). Thereafter, the target value is set to the engagement point pressure $p_{Stroke}$ (block 16) and the maximum value $p_{max}$ is determined (block 17). The time window for determining the maximum value $p_{max}$ ends when the damping time $t_1$ is exceeded and the actual pressure $p_{Ist}$ is within the pressure corridor (determination 18). The determination 19 follows, determining whether the measured maximum value is higher or lower than the maximum admissible pressure $p_{Maxpuls}$. Depending on the result of the determination 19 the pressure increment $\Delta p$ for determining the filling pressure $p_{Puls}$ is subtracted for the next cycle (block 20) or added (block 21).

The blocks representing determinations 22 to 24 are provided for setting the increment $\Delta p$ for the next cycle. The basic idea is that the increment $\Delta p$ is reduced for the next cycle (see block 24 wherein a interval factor $F_p$ is higher than 1) when the maximum value $p_{max}$ of the two subsequent prior cycles includes the maximum admissible pressure $p_{Maxpuls}$. In this case, determination 19 is answered differently, resulting in that the indicators $S_1$ and $S_{old}$ (blocks 20, 21) are different and therefore via the determination 22 result in reducing the increment $\Delta p$.

A determination 25 serves for terminating the process according to FIG. 3. If the increment $\Delta p$ decreases below a neglect threshold pressure $\Delta p_{Grenz}$, the last base pressure value $p_{Basis}$ is stored and the process is terminated (blocks 26, 27). Otherwise, the following two further iterations follow until sufficient accuracy is reached, illustrated by the size of the pressure increment $\Delta p$.

Figure 4:
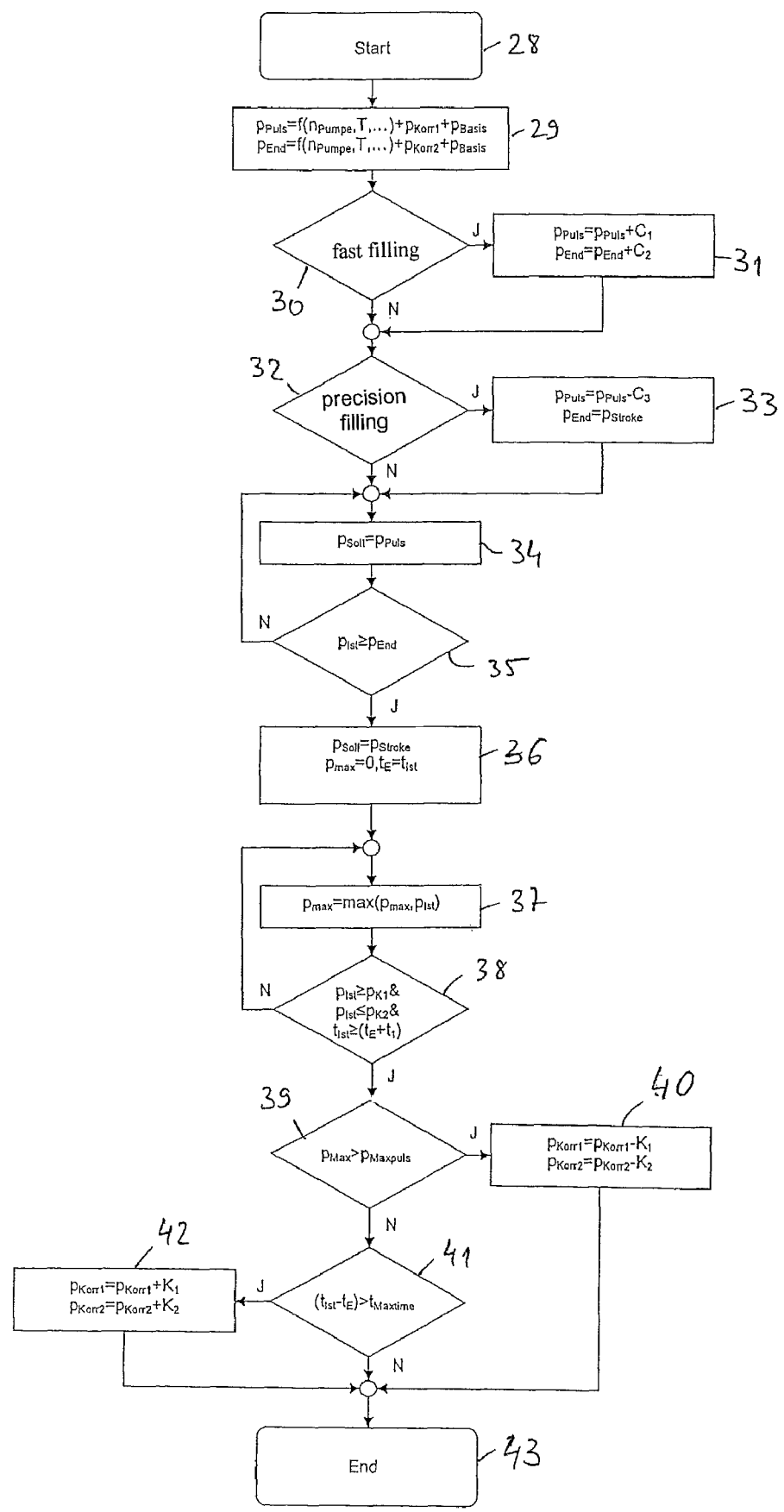
FIG. 4 a flow diagram of a further preferred embodiment of the invention.

While the process according to FIG. 3 is preferably used when the system is operated for the first time, FIG. 4 illustrates a process for adapting of the filling pressure $p_{Puls}$ during driving operation of a motor vehicle. A block 29 following the starting block 28 shows that for adapting the filling pressure $p_{Puls}$ and the turn off pressure $p_{End}$ a first pressure correction value $p_{Korr1}$ and a second pressure correction value $p_{Korr2}$ are provided.

In the determinations 30 and 32 the question of the filling method is solved. Possible are a fast filling (determination 30) and a precision filling (determination 32). At first, it is assumed that a standard filling method has been chosen. This results in that determinations 30, 32 directly lead to block 34.

Blocks or determinations 34 to 39 are related in its sequence to the blocks or determination 14 to 19 in FIG. 3. One difference is now that in case of an overfilling (block 39: $p_{max}$ is higher than $p_{Maxpuls}$) not only the filling pressure $p_{Puls}$, but also the turn off pressure $p_{End}$ is reduced (block 40). Accordingly, a first change value $K_1$ and a second change value $K_2$ are provided that may for example be 5 mbar. In case of a lowfilling (block 39: $p_{max}$ is lower than $p_{Maxpuls}$) the change values $K_1$ and $K_2$ increase the filling pressure $p_{Puls}$ and the turn off pressure $p_{End}$ (block 42).

Another difference in relation to the process according to FIG. 3 is that increasing the filling pressure in case of a given lowfilling takes place only when the end time $t_E$ has exceeded a maximum admissible time $t_{Maxtime}$. In case of a lowfilling according to graph 10 in FIG. 2 a respective increase in the filling pressure $p_{Puls}$ (and also of the turn off pressure $p_{End}$) results, since of the actual pressure $p_{Ist}$ reaches the pressure corridor only after the time $t_E + t_{Maxtime}$.

At higher driving performance, in a deviation from the standard filling method, a fast filling method can be chosen (see determination 30) wherein the filling pressure as well as the turn off pressure are increased for the purpose of a quicker filling while accepting the disadvantages of an overfilling. In case of a precision filling the pressures $p_{Puls}$, $p_{End}$ are set such that an undesired torque transmittal capacity in the clutch 1 is prevented.

An adaption as in the blocks or determinations 34 to 42 accomplishes the desired goals when the standard filling method is chosen since the fast filling and the precision filling processes deviate from the "optimum" filling pressure on purpose. By a simple modification of the flow diagram according to FIG. 4 it can be achieved that an adaption of the filling method in the chosen filling methods "fast filling" or "precision filling" is not conducted.

LIST OF REFERENCE NUMERALS 1 clutch
2 pressure system
3 clutch release spring
4 clutch cylinder
5 clutch piston
6 control valve
7 clutch lining
8 pressure source
9 clutch lining
10 actual pressure graph (filling pressure too low)
11 actual pressure graph (filling pressure too high)
12 to 43 block, determination in a flow diagram

The invention claimed is:

1. Method for determining the filling pressure for a clutch comprising a control device for controlling the clutch, clutch linings, a clutch release spring and a hydraulic pressure system for closing the clutch against a force from the clutch release spring, wherein the clutch linings are brought at an engagement point of the clutch into abutment such that a further increase of the pressure in the pressure system would establish a torque transmittal capacity in the clutch, said method comprising the following steps performed by the control device:

A pressurizing the pressure system with a filling pressure $p_{Puls}$;

B determining an actual pressure $p_{Ist}$ in the pressure system;

C terminating pressurizing of the pressure system with the filling pressure $p_{Puls}$ when the actual pressure $p_{Ist}$ has reached a turn off pressure $p_{End}$ and has therefore reached the end time $t_E$;

D pressurizing the pressure system with an engagement point pressure $p_{Stroke}$ that can maintain the engagement point of the clutch;

E determining the maximum value $p_{max}$ for the actual pressure $p_{Ist}$ after the end time $t_E$, wherein the maximum value $p_{max}$ is compared to a maximum admissible pressure $p_{Maxpuls}$; and F determining the filling pressure $p_{Puls}$ for the next filling in that an increment $\Delta p$ or a change value $K_1$ is
added to the filling pressure $p_{Puls}$ if the maximum value $p_{max}$ is lower than the maximum admissible pressure $p_{Maxpuls}$, or
subtracted from the filling pressure $p_{Puls}$ when the maximum value $p_{max}$ is higher than the maximum admissible pressure $p_{Maxpuls}$.

2. Method according to claim 1, further comprising the method step of providing a time period of at least the duration of a damping time $t_1$ for determining the maximum value $p_{max}$.

3. Method according to claim 1, further comprising the method step of providing at least a time period that ends when the actual pressure $p_{Ist}$ is between a lower threshold value $p_{K1}$ or a higher threshold value $p_{K2}$ for determining the maximum value $p_{max}$.

4. Method according to claim 1, further comprising the method step of repeating the cycle according to steps A to F until the termination criterion is fulfilled.

5. Method according to claim 1, further comprising the method step of reducing the increment $\Delta p$ when in two subsequent cycles the maximum value $p_{pmax}$ is once higher and once lower or once lower and once higher, respectively, than the maximum admissible pressure $p_{Maxpuls}$.

6. Method according to claim 1, further comprising the method step of fulfilling the termination criterion when the increment $\Delta p$ has reached a neglect threshold pressure $\Delta p_{Grenz}$.

7. Method according to claim 1, further comprising the method step of making at least one of the filling pressure $p_{Puls}$ and the turn off pressure $p_{End}$ dependent on on a selected filling method.

8. Method according to claim 7, further comprising the method step of increasing in case of a selected fast filling method at least one of the filling pressure $p_{Puls}$ by a pressure offset C1 and the turn off pressure $p_{End}$ by a pressure offset C2.

9. Method according to claim 7, further comprising the method step of reducing in case of a selected precision filling method at least one of the filling pressure $p_{puls}$ by a pressure value C3 and setting the turn off pressure $p_{End}$ to the engagement point pressure $p_{Stroke}$.

10. Method according to claim 7, further comprising the method step of adding for determining the filling pressure $p_{Puls}$ for the next filling the change value $K_1$ to the filling pressure $p_{Puls}$ when after the turn off time $t_{End}$ a maximum admissible time $t_{Maxtime}$ is exceeded.

11. Method according to claim 7, further comprising the method step of adding for determining the turn off pressure $p_{End}$ for the next filling a change value $K_2$ to the turn off pressure $p_{End}$ when the change value $K_1$ is added to the filling pressure $p_{Puls}$, and subtracting the change value $K_2$ from the turn off pressure $p_{End}$ when the change value $K_1$ is subtracted from the filling pressure $p_{Puls}$.

12. Method according to claim 1, further comprising the method step of providing the filling pressure $p_{Puls}$ as a function of at least one of the rotational speed of a hydraulic pump and the temperature.

13. Method according to claim 9, further comprising the method step of providing the turn off pressure $p_{End}$ as a function of at least one of the filling pressure $p_{Puls}$, the rotational speed of the clutch and the temperature of the clutch.

14. Method according to claim 1, further comprising the method step of safely releasing the clutch first before pressurizing the pressure system with the filling target pressure $p_{BSoll}$ starting from a starting pressure of $p_0$.

15. Method according to claim 1, further comprising the method steps of providing a control valve and a superimposed pressure control correcting an electric control current for the control valve in the pressure system.

16. Method according to claim 15, further comprising the method step of providing a PD control characteristic for the superimposed pressure control when pressurizing the pressure system with the filling pressure $p_{Puls}$.

17. Method according to claim 15, further comprising the method steps of turning off the superimposed pressure control for a few milliseconds after the end time $t_E$ is reached, and thereafter turning the superimposed pressure control on again, wherein then a PID control characteristic is established.

18. Method according to claim 17, wherein turning off step has duration of 5 to 10 milliseconds.

19. A hydraulic clutch comprising clutch linings, a clutch release spring and a hydraulic pressure system for closing the clutch against a force from the clutch release spring, wherein the clutch linings are brought at an engagement point of the clutch into abutment such that a further increase of the pressure in the pressure system would establish a torque transmittal capacity in the clutch, said clutch being adapted to conduct the method steps of claim 1.

20. A hydraulic clutch controlled by a control device, the clutch comprising clutch linings, a clutch release spring and a hydraulic pressure system for closing the clutch against a force from the clutch release spring, wherein the clutch linings are brought at an engagement point of the clutch into abutment such that a further increase of the pressure in the pressure system would establish a torque transmittal capacity in the clutch, said clutch ,through said control device, being adapted to:

A pressurize the pressure system with a filling pressure $p_{Puls}$;

B determine an actual pressure $p_{Ist}$ in the pressure system;

C terminate pressurizing of the pressure system with the filling pressure $p_{Puls}$ when the actual pressure $p_{Ist}$ has reached a turn off pressure $p_{End}$ and has therefore reached the end time $t_E$;

D pressurize the pressure system with an engagement point pressure $p_{Stroke}$ that can maintain the engagement point of the clutch;

E determine the maximum value $p_{max}$ for the actual pressure $p_{Ist}$ after the end time $t_E$, wherein the maximum value $p_{max}$ is compared to a maximum admissible pressure $p_{Maxpuls}$; and F determine the filling pressure $p_{puls}$ for the next filling in that an increment $\Delta p$ or a change value $K_1$ is added to the filling pressure $p_{puls}$ if the maximum value $p_{max}$ is lower than the maximum admissible pressure $p_{Maxpuls}$, or subtracted from the filling pressure $p_{Puls}$ when the maximum value $p_{max}$ is higher than the maximum admissible pressure $p_{Maxpuls}$.

* * * * *